*INVENTOR.*
THOMAS R. HARRISON
LLOYD B. CHERRY
BY
*GB Spangenberg*
ATTORNEY.

INVENTOR.
THOMAS R. HARRISON
LLOYD B. CHERRY
BY
*CB Spangenberg*
ATTORNEY.

Patented May 25, 1948

2,442,329

UNITED STATES PATENT OFFICE 2,442,329

ANTIHUNT ELECTRICAL CONTROL SYSTEM

Thomas R. Harrison, Wyncote, and Lloyd B. Cherry, Philadelphia, Pa., assignors to The Brown Instrument Company, Philadelphia, Pa., a corporation of Pennsylvania Application February 7, 1944, Serial No. 521,336

16 Claims. (Cl. 318—28)

The present invention relates to improvements in automatic exhibiting and/or controlling systems for eliminating the hunting tendency in such systems.

A specific object of the present invention is to provide self-balancing exhibiting and/or controlling apparatus with novel and effective means for including an anticipating control action in the apparatus rebalancing operations so as to eliminate or substantially minimize the hunting tendency which inevitably results from failure to terminate the rebalancing operations promptly enough to avoid over-adjustment of the rebalancing components of the apparatus.

The present invention is of especial utility in self-balancing electrical networks of the potentiometer type in which rebalancing operations are rapidly effected as soon as required by means comprising a reversible rotatable rebalancing motor. Such a motor has a tendency to "coast" or continue to rotate after being deenergized and thus has a tendency to continue its rebalancing adjustment of the electrical network after the motor has been deenergized.

The need for "anti-hunting" provisions in recording and/or controlling apparatus has long been recognized and various arrangements have been previously proposed for the elimination of hunting. One prior art method for preventing hunting is disclosed in patent Reissue 21,309 issued to Thomas R. Harrison on December 26, 1939, for Recording and control system and apparatus therefor in which the speed of rebalance of an electrical network of the above mentioned potentiometer type is effected in accordance with the extent of network unbalance and mechanically movable means are provided for anticipating the true balance. The Harrison Patent 2,263,497 issued November 18, 1941, discloses a self-balancing potentiometric network including means for deriving an electromotive force proportional to the speed of the potentiometric rebalancing motor which is introduced into the detector circuit in opposition to the unbalanced electromotive force of the condition responsive network and operates to produce a condition of simulated rebalance of the potentiometric network before the latter is rebalanced to thereby anticipate the true balance position of the network. In this manner, the rebalancing driving system is slowed down before the true balanced position is reached and then gradually eases into said balance position without the occurrence of overshooting.

The said Harrison Patent 2,263,497 discloses a system including an electrical network and means for producing an unbalanced electromotive force in said network in accordance with the variations in magnitude of a condition under measurement and also includes a device which is adjustable to reduce the unbalanced electromotive force to zero. The said device is adjustable by a reversible motor having a winding which is selectively energized by a detector responsive to the unbalanced electromotive force produced by the network to effect rotation of the motor in one direction or the other in accordance with the sense of the said unbalanced electromotive force. In order to eliminate the hunting tendency of the reversible motor, a bridge network including the said motor winding in one arm is provided and so arranged that an electromotive force proportional to the motor speed is derived at the output terminals of the bridge network upon motor rotation. This last mentioned electromotive force is connected in opposition to the unbalanced electromotive force produced in the electrical network and operates by producing a simulated condition of rebalance of the network before the true balanced position is reached to prevent coasting and consequent over-shooting of the motor beyond the true balanced position.

A particular object of the present invention is to provide improvements in anti-hunting means of the type disclosed in the Harrison Patent 2,263,497, said improvements providing the desirable characteristics of simplicity and a high degree of stability.

The various features of novelty which characterize our invention are pointed out with particularity in the claims annexed to and forming a part of this specification. For a better understanding of the invention, however, its advantages and specific objects attained with its use, reference should be had to the accompanying drawings and descriptive matter in which we have illustrated and described a preferred embodiment of the invention.

Figure 1:
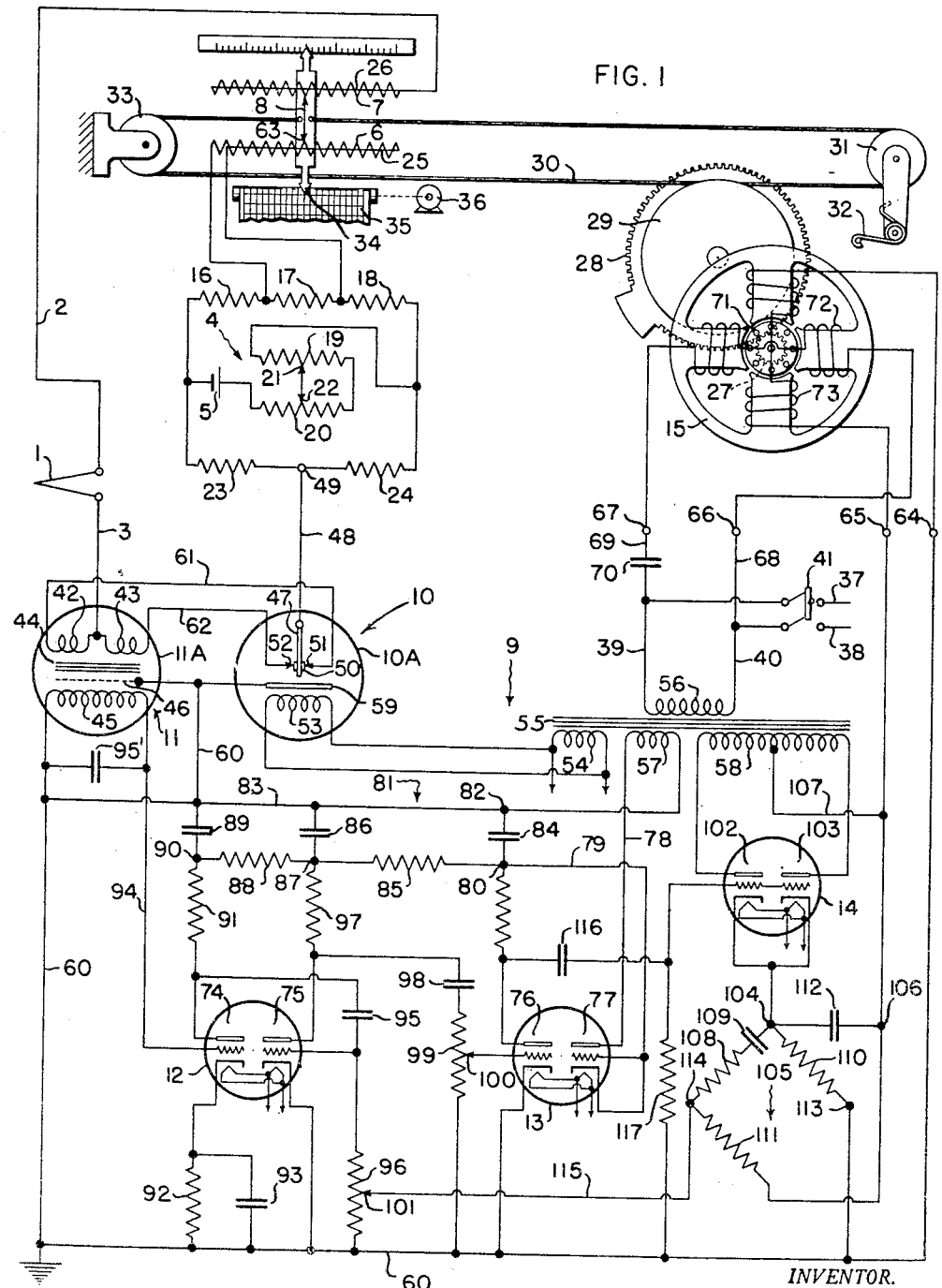
Fig. 1 is a diagrammatic illustration of a self-balancing potentiometric network utilizing the invention.

In Fig. 1 of the drawings, we have illustrated, more or less diagrammatically, an arrangement including an electronic amplifier device to be described for producing effects in accordance with the extent of unbalance of an electrical network of the potentiometric network type which controls the electronic device and is unbalanced in accordance with the variations in a quantity to be measured and in which it is not practicable nor desirable to have the said effects directly produced by the potentiometric network perform a control operation because of the small magnitude of the unbalanced electromotive force produced in the network.

More specifically, an arrangement is illustrated in Fig. 1 for measuring and visually exhibiting the temperature of a furnace (not shown) to which a thermocouple 1 is responsive. The thermocouple usually is located at a position remote from the remainder of the measuring apparatus and has its terminals connected by conductors 2 and 3 to the terminals of a null point potentiometric network 4 which may be of any suitable type such as the Brown potentiometric network disclosed in the Harrison et al. Patent 2,150,502 issued on March 14, 1939.

The potentiometric network 4 is of a well-known type, and it is believed to be sufficient for the present purposes to note that the potentiometric network includes a circuit branch in which the thermocouple 1 is connected, an opposing branch including a source of known potential such as a battery 5 and resistors 6 and 7, a variable portion of which may be connected into the opposed branches in accordance with the adjustment of a sliding contact 8 whereby the respective effects of the variable and known sources are made equal and opposite and the potentiometric network is thus rebalanced for a given value of the electromotive force of the thermocouple 1 with the contact 8 in a corresponding position along the length of resistances 6 and 7. The position of the contact 8 thus provides a measure of the value of the thermocouple electromotive force and may serve as a measure of the temperature to which the thermocouple is exposed.

Upon change in the temperature to which the thermocouple 1 is subjected, an unbalanced direct current potential of one polarity or of the opposite polarity is produced in the potentiometric network 4 depending upon the sense of unbalance of the potentiometric network 4 and consequently upon the direction of the temperature change. The unbalanced direct current potential so produced is impressed on the input circuit of an electronic device indicated generally by the reference character 9. The electronic device 9 includes a vibrator or equivalent device 10, an input transformer 11, amplifying vacuum tubes 12 and 13, and a motor drive vacuum tube 14.

The direct current potential applied to the input circuit of the electronic device 9 is translated by the vibrator 10 into a pulsating current having one polarity or the opposite polarity depending upon the sense of unbalance of the potentiometric network. This pulsating current is converted into an alternating current which is impressed on and amplified by the transformer 11 and is further amplified by the vacuum tubes 12 and 13. The output from the vacuum tubes 12 and 13 is impressed on the input circuit of the motor drive vacuum tube 14 and operates to control the conductivity of the latter as required to effect selective operation of a reversible rotatable electrical motor 15 for rotation in one direction or the other. The motor 15 is employed to operate a slidewire assembly to rebalance the potentiometric network 4 and also serves to adjust an indicating and recording mechanism which is described hereinafter.

The potentiometric network 4 includes three resistances 16, 17 and 18 connected in series in one branch. These resistances are formed of material having substantially a zero temperature coefficient of resistance and are employed for calibration purposes. The battery 5, which may take the form of a dry cell, and a dual vernier rheostat comprising resistances 19 and 20 and electrically connected sliding contacts 21 and 22 which engage the resistances 19 and 20, respectively, are connected in series in a branch in parallel to the branch including resistances 16, 17 and 18. The rheostat may be operated by any suitable type of knob, not shown, which desirably has a direct mechanical connection with the contact 21 and a lost motion connection with the contact 22. Upon initial movement of the knob the contact 21 is first moved and then contact 22 is moved thereby providing a vernier adjustment. To this end, the resistance 20 is preferably of higher resistance than the resistance 19.

Also connected in parallel with the resistances 16, 17 and 18 is a third branch including two series connected resistances 23 and 24. The resistance 23 is preferably made of nickel, copper or other material having a positive temperature coefficient of resistance and the resistance 24 is formed of manganin having a substantially zero temperature coefficient of resistance. The resistance 23 in conjunction with the resistance 24 operates to compensate for changes in the ambient temperature to which the cold or reference junction of the thermocouple is subjected. The resistance 24 is also provided for standardization purposes and has a resistance value such that the potential drop produced across it is of the same magnitude as the potential produced by a standard cell which is not shown but which may be periodically connected to the potentiometric network 4 for standardizing the latter in the manner disclosed, for example, in the Walter P. Wills application filed December 1, 1941, and having Serial No. 421,173, which issued as Patent No. 2,423,540 on July 8, 1947.

The slidewire assembly of the potentiometric network 4 consists of the resistances 6 and 7 and the contact 8. The resistance 6 comprises a coil which is wound around and is insulated from a core 25. Cooperating with the slidewire 6 is the resistance 7 which constitutes a collector bar and comprises a coil wound around a core 26. The slidewire 6 and collector bar 7 are electrically connected by the sliding contact 8 which is moved by the reversible motor 15 as required to restore and maintain the potentiometric network 4 balanced. The terminals of the slidewire 6 and its core 25 are connected in parallel to the resistance 17.

The shaft of motor 15 drives a pinion 27 which is disposed in engagement with a gear 28. Attached to and movable with the gear 28 is a pulley 29 around which is wound an endless cable 30. The cable 30 is connected to the potentiometric rebalancing contact 8 so that when the motor 15 rotates the contact will be moved in one direction or the other to rebalance the potentiometric network. One end of the cable 30 runs over a pulley 31 which is pivotally mounted and biased by a spring 32 to take up the slack in the cable. The other end of the cable runs around a stationary pulley 33.

A pen 34 is mounted on the carriage which carries the potentiometer rebalancing contact 8 and is arranged in cooperative relation with a recorder chart 35 to thereby provide a continuous record of the adjustments of the potentiometer contact 8 which are required to maintain the potentiometric network 4 balanced, and accordingly, to provide a record of the variations in magnitude of the unknown potential produced by the thermocouple 1. The chart 35 may be a strip chart as shown and is adapted to be driven in any convenient manner, as for example, by a unidirectional motor 36 through suitable gearing, not shown, so that a record of the variations in the unknown potential will be recorded as a continuous line on the chart 35.

The electronic device 9 is connected to and receives energizing current from the alternating current supply mains 37 and 38 through a pair of conductors 39 and 40. A double pole-single throw switch 41 is provided between electronic device 9 and the supply mains 37 and 38 for disconnecting the electronic device from the supply mains when it is so desired. Preferably, the switch 41 is so located that when it is adjusted to the position to deenergize electronic device 9 it also deenergizes the chart motor 36.

One input terminal of the electronic device 9 comprises the point of engagement of a pair of primary windings 42 and 43 provided on the transformer 11. This input terminal is that to which one terminal of the thermocouple 1 is connected by the conductor 3. The primary windings 42 and 43 are wound around a core structure 44 on which is also wound a secondary winding 45. A shield 46 is provided between the primary windings 42 and 43 and the secondary winding 45. The windings 42, 43 and 45 and the core structure 44 and shield 46 are all housed in a casing indicated generally by the reference character 11A.

The vibrator 10 may desirably be of the type disclosed and claimed in the copending application of Frederick W. Side filed December 1, 1941 and bearing Serial No. 421,176, and now Patent No. 2,423,524 of July 8, 1947, and comprises a vibrating reed 47 for operating a contact 50 with respect to a pair of oppositely disposed and relatively stationary contacts 51 and 52. The contact 50 is connected through the vibrating reed 47 to the potentiometric network point 49 through the conductor 48 and constitutes the second input terminal of the electronic device 9. The vibrating reed 47 is vibrated under the influence of a winding 53 which is supplied with alternating current from the secondary winding 54 of a transformer 55 having a line voltage primary winding 56 and additional secondary windings 57 and 58. A permanent magnet 59 associated with the vibrating reed 47 is utilized for polarizing and synchronizing purposes. The mounting structure for the vibrating reed contacts, operating winding, and permanent magnet are all connected to a grounded conductor 60 located in the electronic device 9. A housing designated by the reference character 10A encloses the mechanism of the vibrator.

As illustrated in the drawing, the contact 51 of the vibrator 10 is connected by a conductor 61 to the terminal of the transformer primary winding 42 which is remote from the primary winding 43. Similarly, the contact 52 of the vibrator is connected by a conductor 62 to the terminal of transformer primary winding 43 which is remote from the primary winding 42. As the vibrating reed 47 vibrates, therefore, the transformer primary windings 42 and 43 will alternately be connected in a series circuit which may be traced from one terminal of the thermocouple 1 through conductor 3, one or the other of the transformer primary windings 42 and 43, the vibrating reed 47, conductor 48 to the potentiometric network point 49, contact 8 of the potentiometric network slidewire assembly, collector bar 7 and conductor 2 back to the other terminal of the thermocouple 1. For convenience, the point of engagement of the contact 8 and the slidewire resistance 6 has been designated by the reference numeral 63.

With the arrangement thus far described, the magnitude and direction of current flow through the circuit branch from the potentiometric network point 49 to the vibrator 10, the transformer 11, and the thermocouple 1 to the potentiometric network point 63 depends upon the relation between the electromotive force produced by the thermocouple 1 and the potential difference between the potentiometric network point 49 and the potentiometric network point 63. The thermocouple 1 is so connected to the potentiometric circuit that the electromotive force of the thermocouple 1 opposes the potential difference between the potentiometric network points 49 and 63. The potential difference between the potentiometric network points 49 and 63 is increased and decreased by movement of the sliding contact 8 to the right and to the left, respectively. With a suitable adjustment of the sliding contact 8, the potential difference between the potentiometric network points 49 and 63 will be made equal and opposite to the electromotive force produced by the thermocouple 1 and no current will flow through the above traced circuit including the vibrator 10 and the primary windings of the transformer 11. On an increase in the thermocouple electromotive force above the potential difference between the points 49 and 63, current will flow in one direction through the vibrator 10 and the primary windings 42 and 43 of the transformer 11 and such current flow may then be eliminated by a suitable adjustment of the sliding contact 8 to the right. When the electromotive force of the thermocouple 1 becomes less than the potential difference between the potentiometric network points 49 and 63, the current flow through the vibrator 10 and the primary windings of transformer 11 will be in such a direction as to be eliminated by a suitable adjustment of the sliding contact 8 to the left.

As noted above, the sliding contact 8 is adjusted along the slidewire resistance 6 and the collector bar 7 by the reversible motor 15. The reversible motor 15 has a pair of terminals 64 and 65 which are connected in the output circuits of the vacuum tube 14 and also has a pair of terminals 66 and 67 which are connected by means of conductors 68 and 69 to the alternating current supply mains 37 and 38 through the switch 41. A condenser 70 of suitable value is connected in the conductor 69.

The motor 15 comprises a rotor 71 and two pairs of oppositely disposed field poles on one pair of which a winding 72 is wound and on the other pair of which a winding 73 is wound. Winding 72 has its terminals connected to the motor terminals 66 and 67 and is supplied with energizing current from the alternating current supply mains 37 and 38 through the condenser 70. Due to the action of the condenser 70 the current which flows through the motor winding 72 will be in phase with the voltage of the alternating current supply mains. The winding 73 has its terminals connected to the motor terminals 64 and 65 and is supplied with energizing current from the output circuits of the vacuum tube 14 which as shown includes two triodes. The current supplied to the winding 73 from the vacuum tube 14 either leads or lags by approximately 90° the voltage of the alternating current supply mains and establishes a field in the motor rotor 71 which is displaced 90° in one direction or the other with respect to that established therein by the winding 72. The reaction between the field set up by the winding 73 with that set up by the winding 72 establishes a rotating field in the rotor which rotates in one direction or the other depending upon whether the winding 73 is energized with current which leads or lags the voltage supplied by the supply mains 37 and 38 and consequently, as is explained in detail hereinafter, in accordance with the direction of unbalance of the potentiometric network 4. The direction and duration of rotation of the motor 15 is controlled in accordance with the direction and extent of unbalance of the potentiometric network 4 so that on rotation of the motor 15 the sliding contact 8 is adjusted in the proper direction to rebalance the potentiometric network 4.

The amplifying tube 12 of the electronic device 9 includes two heater type triodes designated by the reference characters 74 and 75 within the same envelope. The triodes 74 and 75 each include anode, control electrode, cathode and heater filament elements. The heater filaments are connected in parallel and are supplied with energizing current from the transformer secondary winding 54. In order not to complicate the drawing the conductors connecting the transformer secondary winding 54 to the heater filaments of triodes 74 and 75 have not been shown. The transformer secondary winding 54 is also connected by conductors (not shown) to the heater filaments contained within the amplifying tube 13 and also to the heater filaments contained within the motor drive tube 14.

The electronic tube 13 also includes two heater type triodes designated by reference numerals 76 and 77 within the same envelope. Each of the triodes 76 and 77 includes anode, control electrode, cathode and heater filament elements. The heater filaments of triodes 76 and 77 are also connected in parallel. The triode 77 is utilized as a half wave rectifier to provide a source of unidirectional voltage for energizing the anode or output circuits of the triodes 74, 75 and 76. To this end, the control electrode and cathode of the triode 77 are directly connected to each other, and the output circuit thereof is energized by the transformer secondary winding 57 through a circuit which may be traced from the left end terminal of the winding 57 through a conductor 78 to the anode of triode 77, the cathode and through a conductor 79 to the positive terminal 80 of a filter generally designated by the reference character 81. The negative terminal 82 of the filter is connected by a conductor 83 to the right end terminal of the transformer secondary winding 57 and is also directly connected to the grounded conductor 60.

The filter 81 includes a condenser 84 which operates to smooth out the ripple in the output voltage of the filter between the points 80 and 82 and also includes a resistance 85 and a condenser 86 which operate to smooth out the voltage between the filter points 87 and 82. A further resistance 88 and a condenser 89 are provided in the filter to smooth out the voltage between the filter points 90 and 82. Accordingly, the filter comprises three stages. A three-stage filter is provided because for the most satisfactory and efficient operation it is desirable that the anode voltage supplied to the triode 74 be substantially free from ripple whereas it is not necessary to supply anode voltage so completely free from ripple to the output circuit of the triode 75. Likewise, it is not necessary to supply anode voltage so free from ripple to the triode 76 as it is to triode 75.

The anode or output circuit of the triode 74 may be traced from the filter point 90 which comprises the positive terminal of the direct current voltage supply through a fixed resistance 91 to the anode of triode 74, the cathode and through a cathode biasing resistance 92 shunted by a condenser 93 to the negative filter point 82 through the grounded conductor 60. The cathode biasing resistance 92 and condenser 93 are provided for biasing the control electrode of triode 74 negatively with respect to the cathode.

The input circuit of the triode 74 may be traced from the cathode through the parallel connected resistance 92 and condenser 93 and through the grounded conductor 60, transformer secondary winding 45 and a conductor 94 to the control electrode of triode 74. A tuning condenser 95' is preferably connected in shunt to the transformer winding 45 as shown.

The output circuit of triode 74 is resistance-capacity coupled to the input circuit of triode 75 by means of a condenser 95 and a resistance 96. Specifically, the anode of triode 74 is connected by condenser 95 to the control electrode of triode 75 and the control electrode of triode 75 is connected through the resistance 96 to the grounded conductor 60 and thereby to the cathode of triode 75 since the latter is directly connected to the grounded conductor 60.

The anode or output circuit of the triode 75 may be traced from the positive terminal 87 of the filter 81 through a fixed resistance 97 to the anode of triode 75, the cathode and the grounded conductor 60 to the negative terminal 82 of the filter.

The output circuit of triode 75 is resistance-capacity coupled to the input circuit of the triode 76 by means of a condenser 98 which is connected between the anode of triode 75 and the control electrode of the triode 76 and by means of a potentiometer resistance 99 which is connected between the control electrode of triode 76 and the cathode thereof. A contact 100 in adjustable engagement with the resistance 99 is provided for varying the point of connection of the control electrode of triode 76 to the resistance 99. The resistance 99 and contact 100 perform a dual function, namely, to limit the extent to which the control electrode of the triode 76 may be driven positive with respect to its associated cathode and also to vary the proportion of the signal impressed on the control electrode of triode 76 from the output circuit of the triode 75. The resistance 96 connected in the input circuit of the triode 75 also serves to limit the extent to which the control electrode of triode 75 may go positive with respect to its associated cathode and in addition operates to maintain the control electrode of the triode 75 at the same potential as its associated cathode when no voltage is produced in the transformer secondary winding 45. The sliding contact 101 in engagement with the resistance 96 is provided for a purpose described hereinafter.

The electronic tube 14 includes two heater type triodes 102 and 103 within the same envelope. Anode voltage is supplied the output circuit of the triode 102 from the transformer secondary winding 58 through a circuit which may be traced from the left end terminal of the secondary winding 58 to the anode of triode 102, the cathode thereof to one input terminal 104 of a bridge network designated generally by the reference character 105 and from the other input terminal 106 of the bridge network through a conductor 107 to a center tap on the transformer secondary winding 58. The anode circuit of the triode 103 may be traced from the right end terminal of the transformer secondary winding 58 to the anode of triode 103, the cathode and through the bridge network 105 and conductor 107 to the center tap on winding 58.

Figure 2:
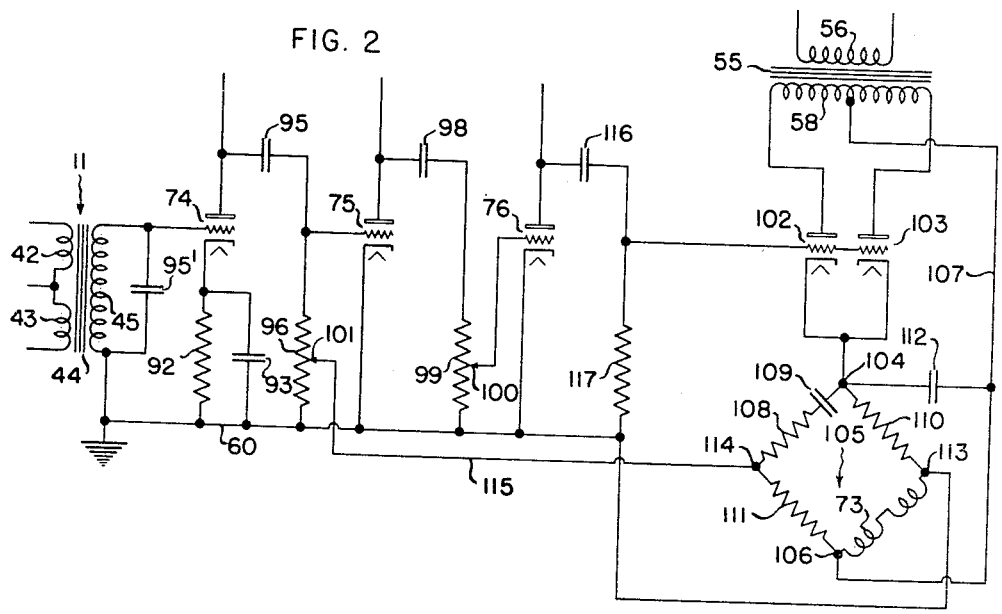
Fig. 2 is a wiring diagram showing only a portion of the electronic amplifier and motor drive circuit of the arrangement of Fig. 1 for the purpose of facilitating understanding of the invention.

As will be more readily seen by reference to Fig. 2 which discloses in a more schematic manner a portion of the electronic device 9, the winding 73 of the reversible electric motor 15 comprises one arm of the bridge network 105. A diametrically opposed arm of the bridge network includes a resistance 108 and a condenser 109 connected in series. The remaining two arms of the bridge network include fixed resistances 110 and 111, respectively. A condenser 112 of value suitable for tuning the motor winding 73 is connected across the input terminals 104 and 106 of the bridge network. One output terminal 113 of the bridge network is connected to the grounded conductor 60 and the other output terminal 114 of the bridge network is connected by a conductor 115 to the sliding contact 101 which is disposed in engagement with the resistance 96.

The bridge network 105 is provided in order that the speed of the reversible motor 15 may be as great as possible during the rebalancing operation of the potentiometric network 4 without over-shooting of the balance point and consequent hunting taking place. Its operation is explained in detail hereinafter.

The output circuit of the triode 76 is resistance-capacity coupled to the input circuits of the triodes 102 and 103 by means of a condenser 116 and a fixed resistance 117. In particular, the anode of the triode 76 is connected through the condenser 116 to both of the control electrodes of the triodes 102 and 103 and the said control electrodes are both connected through the resistance 117 to the grounded conductor 60. Thus, the input circuits of the triodes 102 and 103 are connected in parallel. The resistance 110 of the bridge network 105 constitutes a biasing resistance for the input circuits of the triodes 102 and 103 and is connected between the cathodes of the triodes 102 and 103 and the grounded conductor 60. The resistance 117 connected in the input circuits of the triodes 102 and 103 operates to maintain the control electrodes of the said triodes at the same potential as the negative terminal of resistance 110 when no voltage is induced in the transformer secondary winding 45, and upon the induction of a voltage in the transformer secondary winding 45, resistance 117 permits the flow of grid current to thereby limit the extent to which the control electrodes of the triodes 102 and 103 may go positive with respect to their associated cathodes.

The motor 15 is preferably so constructed that the impedance of the winding 73 is the proper value to match the impedance of the anode circuits of the triodes 102 and 103 when the motor is operating in order to obtain the most efficient operation. Preferably, the motor is so constructed that it has a high ratio of inductance to resistance, for example, of the order of 6 to 1 or from 8 to 1 at the frequency of the energizing current supplied to it. This provides efficient operation and power during the running condition of the motor with the least amount of heating and also provides a low impedance path which makes possible a desirable braking action.

The condenser 70 connected in the energizing circuit of the motor winding 72 is so selected with respect to the inductance of the latter as to provide a series resonant circuit having a unity power factor. By virtue of the series resonant circuit, the total impedance of the motor winding 72 is substantially equal to the resistance of the winding, and since this resistance is relatively low a large current flow through the motor winding 72 is made possible. This permits the attainment of maximum power and torque from the motor 15. In addition, the current flow through the motor winding 72 is in phase with the voltage of the alternating current supply mains 37 and 38 because of the series resonant circuit. The voltage across the motor winding 72, however, leads the current flow by substantially 90° because of the inductance of the winding 72.

Energizing current is supplied to the motor winding 73 from the transformer secondary winding 58 through the anode circuits of the triodes 102 and 103 through the circuits previously traced. The condenser 112 which is connected across the input terminals of the bridge network 105, one arm of which includes the motor winding 73, is so chosen as to provide a parallel resonant circuit with the motor winding 73 having substantially unity power factor. This parallel resonant circuit presents a relatively high external impedance and a relatively low local circuit impedance. To this end, resistance 110 is desirably of small value. The relatively high external impedance is approximately the same as the impedance of the anode circuits of the triodes 102 and 103 and therefore provides efficient operation. The relatively low or internal circuit impedance approximates the actual resistance of the motor winding 73, and since this resistance is relatively low the impedance of the local circuit is also relatively low.

For the condition when the potentiometric network 4 is balanced, no voltage is induced in the transformer secondary winding 45, and hence, the potentials of the control electrodes of all of the triodes 74, 75, 76, 102 and 103 remain substantially constant. Under this condition of operation a pulse of unidirectional current flows through the anode circuit of the triode 102 to the motor winding 73 from the left hand section of the transformer secondary winding 58 during the first half cycle of the alternating voltage supply. In the second half cycle of the alternating voltage supply a pulse of unidirectional current flows through the anode circuit of the triode 103 to the motor winding 73 from the right hand section of the transformer secondary winding 58. Since the control electrodes of the triodes 102 and 103 are connected together and inasmuch as the potentials of these control electrodes remain substantially constant when the potentiometric network 4 is balanced, pulses of equal magnitude flow in the anode circuits of the triodes 102 and 103 during alternate half cycles of the alternating voltage supplied by the transformer secondary winding 53. As a result when the potentiometric network 4 is balanced, pulsating unidirectional current of twice the frequency of the alternating supply current is impressed on the motor winding 73. When thus energized, the motor rotor 71 is not urged to rotation in either direction and remains stationary. Due to the relatively high direct current component of the current then flowing through the motor winding 73 the core structure of the motor 15 tends to become saturated whereby the inductive reactance of the motor winding 73 is relatively small. The condenser 112 in shunt to the motor winding 73 and the resistance 110 are so chosen that the condenser and motor winding then form a parallel resonant circuit. This saturation of the core structure of the motor 15 operates to exert a damping effect on the rotor 71 of the motor or in other words an effect tending to retard rotation of the rotor 71. By virtue of this effect, if the rotor 71 has been rotating saturation of the motor core structure tends to stop the rotation.

Upon unbalance of the potentiometric measuring network 4 in one direction, the magnitude of the pulses of current flowing in the anode circuit of the triode 102 will be increased while the magnitude of the pulses of current flowing in the anode circuit of the triode 103 will be decreased. Consequently, the pulses of unidirectional current supplied to the motor winding 73 during the first half cycle will predominate over those supplied the motor winding 73 during the second half cycle. Such energization of the motor winding 73 operates to introduce therein an alternating component of current of the same frequency as that supplied by the alternating current supply mains 37 and 38. This alternating component of current may be either dephased 90° or 270° with respect to the alternating current flowing through motor winding 72 and produces an alternating magnetic field in the motor core structure which reacts with the alternating magnetic field established by the motor winding 72 to produce a rotating field in one direction in the rotor. This rotating field rotates in one direction or the other depending upon the direction of potentiometric unbalance and effects actuation of the motor rotor 71 for rotation in a corresponding direction. When the motor winding 73 is so energized, the direct current component of current is decreased, and therefore, the saturation of the motor core structure is decreased with the result that the rotor damping effect is also reduced. Upon unbalance of the potentiometric measuring network 4 in the opposite direction, the conductivity of triode 103 will be rendered greater than that of triode 102 and as a result a rotating field will be established in the rotor 71 to urge the latter to rotation.

In order to obtain rapid operation of the reversible electrical motor 15 during the rebalancing operation of the potentiometric network 4 without the occurrence of overshooting and consequent hunting, the response of the motor 15 is correlated with the unbalancing and the rebalancing operations of the potentiometric network. This is accomplished by adjusting the contact 100 along the resistance 99 which is employed for the purpose of coupling the output circuit of the triode 75 to the input circuit of the triode 76. By moving the contact 100 in an upward direction the amplitude of signal on the control electrodes of triodes 102 and 103 is increased for any given signal induced in the transformer secondary winding 45 and by moving the contact 100 in a downward direction the amplitude of signal is decreased. This, therefore, adjusts the sensitivity of the electronic device 9 whereby the response of the reversible electrical motor 15 may be correlated exactly with the operation of the potentiometric network 4.

For many purposes such correlation and the damping action obtained as a result of the direct current component of current through the motor winding 73 is sufficient to prevent over-shooting and consequent hunting of the motor from occurring. There are other applications, however, wherein it is desired to effectuate the rebalancing operations of the potentiometric network 4 at a higher rate of speed and in those applications the damped operation obtained by means of the direct current component through the motor winding 73 and the above mentioned correlation is insufficient to prevent coasting and consequent hunting from occurring. In order that the speed of the reversible motor 15 may be increased so as to fulfill the conditions of such high speed applications without over-shooting and consequent hunting occurring, means including the bridge network 105 have been provided in accordance with the present invention to insure that the motor speed is substantially proportional to the extent of unbalance of the potentiometric network 4. This result is obtained by deriving from the bridge network 105 a voltage of the same frequency as the voltage of the supply mains 37 and 38, the magnitude of which is a function of the motor speed and the phase of which is determined by the direction of rotation thereof, and by introducing this voltage into the electronic device 9 in opposition to the amplified quantity of the unbalanced voltage derived from the potentiometric network 4. With this arrangement, as the sliding contact 8 approaches its new balanced position, the unbalanced voltage of the potentiometric network 4 will decrease in value and if the motor speed is then such that it would ordinarily coast beyond the balanced position due to its inertia and the inertia of the associated rebalancing mechanism, the opposing voltage which is introduced into the circuit from the bridge network 105 will produce a temporary condition of rebalance before the true balanced position is reached to thereby anticipate the position at which the motor is deenergized for rotation. By proper choice of the circuit constants the opposing voltage derived from the bridge network 105 may be made greater than the amplified quantity of the potentiometric unbalanced voltage to produce a positive damping action which will quickly check the motor speed before the balanced position is reached and gradually reduce it to zero as the potentiometric unbalance is reduced to zero. Such positive damping action results when the feedback voltage is greater than the amplified quantity of the potentiometric unbalanced voltage because the motor 15 is then energized for rotation in the direction opposite to that in which it is actually rotating. Such energization is the equivalent of a powerful braking force. By virtue of the provision of the feedback bridge network 105, therefore, the speed of operation of the reversible motor 15 in effecting rebalance of the potentiometric network 4 may be made exceedingly great without the occurrence of over-shooting and consequent hunting of the potentiometric network about the true balanced position.

The bridge network 105 is of a type known in the art as a Hay bridge and includes fixed resistances 110 and 111 in two diametrically opposed arms and capacitance and inductance, respectively, in each of the other opposed arms. The inductance is that of the motor winding 73 and the capacitance is that of condenser 109. As shown, the bridge arm including condenser 109 includes a series connected resistance 108. The value of condenser 109 is so chosen as to offset, at least to a substantial extent and, if desired, entirely, the effect of the inductance of motor winding 73 so that when the motor rotor 71 is at rest the bridge network 105 is substantially balanced, and hence, little or no unbalanced voltage useful for motor braking appears at the bridge output terminals 113 and 114. If desired, the value of condenser 109 may be so chosen in relation to the other circuit components that the bridge network 105 is exactly balanced when the rotor 71 is stationary, but in order to obtain an optimum condition of stability in the balanced state, we have discovered that it is desirable for the bridge network 105 to be so adjusted as to be slightly out of balance, when the motor is at rest, in the proper sense that a small electromotive force of the same frequency as that of the amplified quantity of the potentiometric unbalanced electromotive force is fed back in opposition to the latter. It has been found that such arrangement substantially eliminates the tendency of the rotor 71 of the motor to chatter when the potentiometric network 4 is in its balanced condition and appreciably improves the stability of operation.

On rotation of the motor rotor 71 an electromotive force of one phase or of opposite phase relatively to the voltage of the supply mains 37 and 38 and of the same frequency is produced at the bridge output terminals 113 and 114. The magnitude of this electromotive force is dependent upon and varies in accordance with the speed of rotation of the rotor 71, and is impressed through conductors 115 and 60 across a portion of resistance 96 in the input circuit of triode 75 depending upon the adjustment of contact 101. The said electromotive force is so fed back to the resistance 96 as to oppose the fluctuating electromotive force produced across the latter as a result of potentiometric unbalance. The amount of the said electromotive force which is fed back may be adjusted by manipulation of contact 101 along resistance 96.

The precise manner in which an electromotive force is produced at the bridge output terminals 113 and 114 upon motor rotation is not now known to us, but it is believed to be a complex quantity created by two effects, one of which is due to transformer action between the motor windings 72 and 73 and the other of which is due to change in impedance of the winding 73. Both of these two effects are additive, that is, the electromotive force created at the bridge output terminals 113 and 114 by one of said effects augments the electromotive force there produced by the other effect.

The transformer action effect will be first explained. Since the motor windings 72 and 73 are displaced 90° with respect to each other on the core structure of the motor, no lines of magnetic flux established by the winding 72 link any turns of the winding 73 when the rotor 71 is stationary, and hence, no electromotive force is then induced in winding 73 as a result of transformer action between windings 72 and 73. Upon rotation of the rotor 71, however, the magnetic flux established by the winding 72 is distorted whereupon some lines of said magnetic flux link the turns of winding 73 to induce an electromotive force in the latter of the same frequency as the voltage supplied by mains 37 and 38. The induction of this electromotive force in winding 73 causes an electromotive force of the same frequency to appear at the bridge output terminals 113 and 114. The magnitude and the phase of this electromotive force relatively to the voltage of the supply mains 37 and 38 varies in accordance with the speed of rotation of rotor 71 and the direction of rotation thereof, respectively, inasmuch as the extent of distortion of the magnetic field of winding 72 is dependent upon the speed of rotation of rotor 71 and the direction of distortion is determined by the direction of rotor rotation.

The manner in which a component of electromotive force is produced at the bridge output terminals 113 and 114 upon motor rotation by virtue of change in impedance of the motor winding 73 occasioned by such rotation will now be explained. As has been explained previously, the constants of the bridge network 105 are so chosen that at the frequency of the voltage supplied by mains 37 and 38 the bridge network 105 will be either exactly balanced or slightly out of balance where greater stability is desired. The value of condenser 109 is then effective to either entirely, or almost entirely, cancel out the inductive effect of motor winding 73. Upon motor rotation, however, the effective coupling between the motor windings 72 and 73 is changed and this effective change in coupling produces an apparent change in inductance and also in resistance of winding 73. At such new apparent value of inductance and resistance of winding 73 the condenser 109 is not operative to balance the bridge network to the same extent as when the motor is at rest, and hence, the bridge network 105 becomes unbalanced. The extent of bridge network unbalance which is effected in this manner varies in accordance with the speed of rotation of the rotor 71 since the apparent change in impedance of winding 73 is dependent upon the speed of rotation of rotor 71. The change in inductance of winding 73 with motor rotation is always in the same direction regardless of the direction of motor rotation, and hence, the bridge network is unbalanced in the same direction irrespective of the direction of motor rotation.

While the bridge network 105 is always unbalanced in the same direction regardless of the direction of motor rotation, such unbalance nevertheless is operative to cause an electromotive force in phase with the voltage of the supply mains 37 and 38 to appear at the bridge output terminals 113 and 114 upon rotation of the motor in one direction and to produce an electromotive force 180° out of phase with the voltage of the supply mains 37 and 38 at the bridge output terminals upon rotation of the motor in the opposite direction. Such phase shift upon reversal in the direction of motor rotation is produced because pulsating current in phase with the voltage of the supply mains 113 and 114 is impressed on the bridge input terminals 104 and 106 when the potentiometric network 4 is unbalanced in one direction, and pulsating current of opposite phase is impressed on the bridge input terminals when the potentiometric network 4 is unbalanced in the opposite direction. In the first case, the motor is energized for rotation in one direction, and in the second case, the motor is energized for rotation in the opposite direction. Consequently, the same change in impedance of motor winding 73 produces an electromotive force of one phase at the bridge output terminals 113 and 114 when the motor is energized for rotation in one direction and produces an electromotive force of opposite phase at the bridge output terminals when the motor is energized for rotation in the opposite direction.

As the motor rotor 71 gains speed during a rebalancing operation of the potentiometric network 4, the unbalance of the potentiometric network is partially compensated for by the complex quantity derived from the bridge network 105 to thereby establish a new, although temporary, balanced position of sliding contact 8 along the slidewire resistance 6. When the contact 8 subsequently moves into that temporary balanced position, the motor 15 will be deenergized for rotation and will slow down. Accordingly, as the slidewire contact 8 approaches its new balanced position, the energization of motor 15 will be interrupted before the true balanced position is reached and will gradually ease into its new balanced position without coasting beyond. During such a rebalancing operation, the opposing voltage which is introduced into the electronic device 9 from the bridge network 105 may be made appreciably greater than the unbalanced voltage obtained from the potentiometric network 4 and, as a result, the motor 15 may actually be energized for rotation in the reverse direction from that in which it is rotating. Such operation produces a positive damping or braking action on the motor rotor which will quickly stop its rotation and positively prevent coasting beyond the true balanced position, and hence, makes possible rebalancing of the potentiometric network 4 by the reversible motor 15 and the associated rebalancing mechanism at a very high rate of speed without the occurrence of overshooting and consequent hunting.

It is noted that the bridge network 105 illustrated in Figs. 1 and 2 is of a type which may be exactly balanced only at one frequency of the energizing electromotive force impressed on its input terminals. In practice, the bridge components are so chosen that the bridge network is balanced when fluctuating voltage of the frequency of the supply lines 37 and 38 is impressed on its input terminals 104 and 106. For reasons of stability, as previously noted, the constants are so chosen that some slight output voltage is derived from the bridge network when the motor is at rest. For all other frequencies of applied voltages, the bridge network is not balanced, and hence, voltage components having such other frequencies will appear at the output terminals 113 and 114 of the bridge.

With the arrangement of Figs. 1 and 2 the voltage impressed on the input terminals 104 and 106 from the motor drive stage including tube 14 and transformer secondary winding 58 will include a component of twice the frequency of the voltage supplied by mains 37 and 38, and accordingly, an electromotive force of this higher frequency will be produced at the bridge output terminals 113 and 114 and will be impressed through the feedback conductors 60 and 115 across the resistance 96 in the input circuit of triode 75 even when the rotor 71 of motor 15 is at rest. This higher frequency of electromotive force is not effective to actuate motor 15 for rotation, however, since the motor drive stage is of a frequency discriminating type and will not respond to voltages of twice the frequency of that supplied by the supply mains 37 and 38 for energizing motor 15 to rotation.

Although the presence of such a double frequency component of electromotive force at the bridge output terminals 104 and 106 is not effective to cause motor rotation, it may nevertheless be desirable in some instances to eliminate such double frequency component because of the loading effect of the latter upon the electronic device 9, and in such applications we prefer to employ the embodiments of our invention illustrated in Figs. 3–6.

Figure 3:
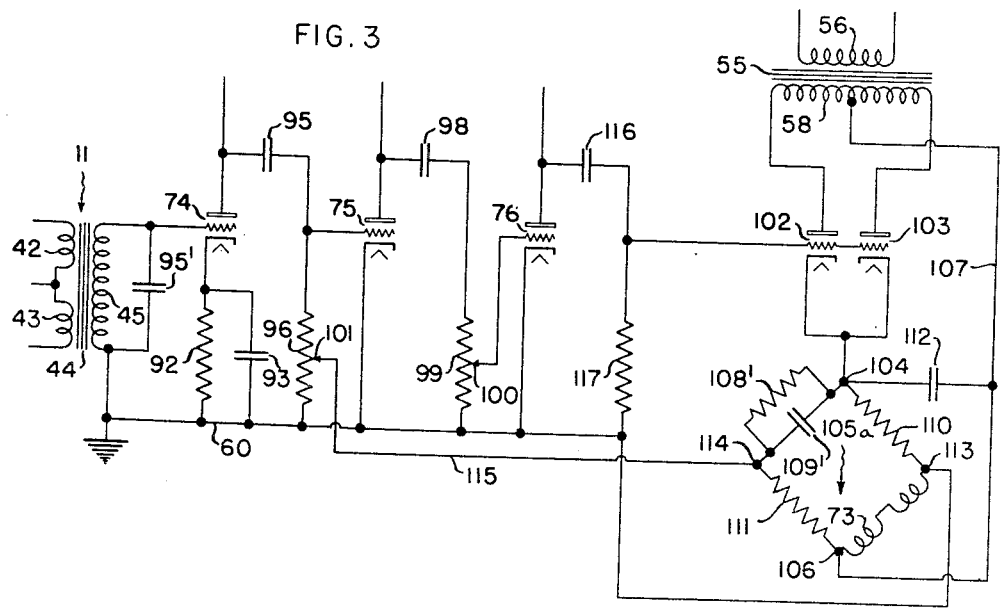
Figs. 3, 4, 5 and 6 illustrate different modifications of the arrangement of Figs. 1 and 2.

The modification of Fig. 3 is generally similar to that of Figs. 1 and 2 both in appearance and operation but differs therefrom in that a bridge network 105a is utilized in lieu of the bridge network 105. The bridge network 105a includes the motor winding 73 in one arm, fixed resistances 110 and 111 in two other arms, and a condenser 109′ shunted by a resistance 108′ in the remaining arm. Such a bridge network is known generally in the art as a Maxwell bridge. In a bridge of this type the state of balance, according to theory, is not affected by variation in frequency of the voltage impressed on its input terminals. Accordingly, the bridge network 105a is characterized in that when the motor rotor 71 is stationary little or no undesired components of voltage which may load or otherwise adversely affect the electronic device 9 are produced at the bridge output terminals.

Figure 4:
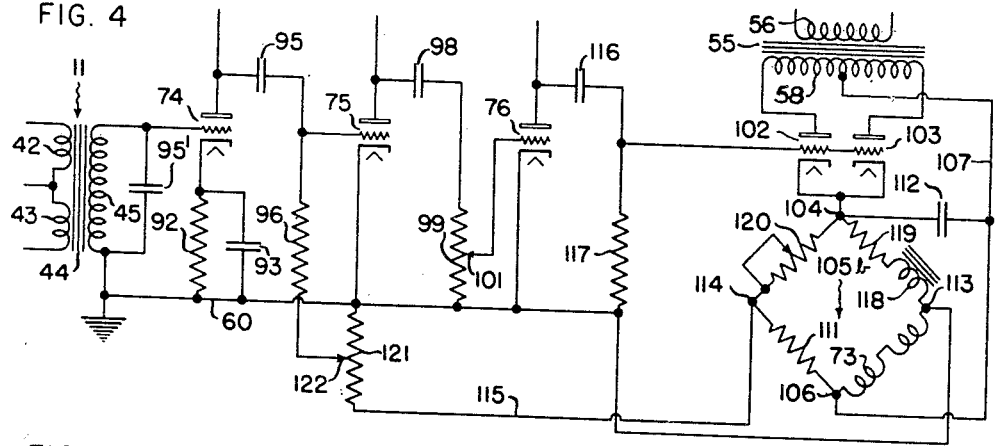

In Fig. 4, we have illustrated another modification of the arrangement illustrated in Figs. 1 and 2 which may be utilized for obtaining rebalancing of the potentiometric network 4 at high speed without coasting and hunting occurring and in which voltage components of undesired frequency in the feedback circuit have been eliminated. The arrangement of Fig. 4 differs from that shown in Figs. 1 and 2 in that the condenser 109 of Figs. 1 and 2 has been eliminated and an inductance 118 is utilized instead for balancing the bridge network 105b when the motor rotor is stationary. As shown in Fig. 4, the bridge network 105b includes the motor winding 73 in one arm and the inductance 118 and a fixed resistance 119 in series in an adjacent arm. The remaining arms are comprised of a fixed resistance 111 and a variable resistance 120, respectively. The operation of the bridge network 105b in producing an electromotive force of one phase or of opposite phase upon motor rotation in one direction or the other and of a magnitude depending upon the speed of motor rotation is essentially the same as that of the bridge network 105 of Figs. 1 and 2.

The arrangement of Fig. 4 differs further from that of Figs. 1 and 2 in that the output potential from the bridge network 105b is impressed across the terminals of a fixed resistance 121 and a variable part of the potential drop produced across the latter is impressed on the input circuit of the triode 75 depending upon the adjustment of a sliding contact 122 along the resistance 121. By adjusting the contact 122 along resistance 121, the magnitude of the opposing voltage introduced into the input circuit of triode 75 from the bridge network 105b may be varied as required to exactly compensate for the hunting tendency of the reversible motor 15 during the rebalancing operation. With this arrangement the resistance connected in circuit with the bridge output terminals remains constant regardless of the position of contact 122 along resistance 121. This is a desirable feature not obtained in the Figs. 1 and 2 form of our invention.

By proper choice of the components of bridge network 105b, undesired components of voltage of frequencies other than that of the supply mains 37 and 38 may be prevented from appearing at the output terminals 113 and 114 regardless of whether the motor 15 is rotating or is at rest. To this end, the saturation characteristics of the fixed inductance 118 are desirably so related to the saturation characteristics of the motor winding 73 that the bridge network 105b will be balanced, whether voltage of the frequency of the supply mains 37 and 38 is impressed on the input terminals 104 and 106 from the motor drive tube 14 and transformer secondary winding 58, or whether voltage of twice that frequency is impressed on the input terminals from said motor drive tube and transformer winding, as the energization of motor 15 is increased from zero speed energization to full speed energization.

Figure 5:
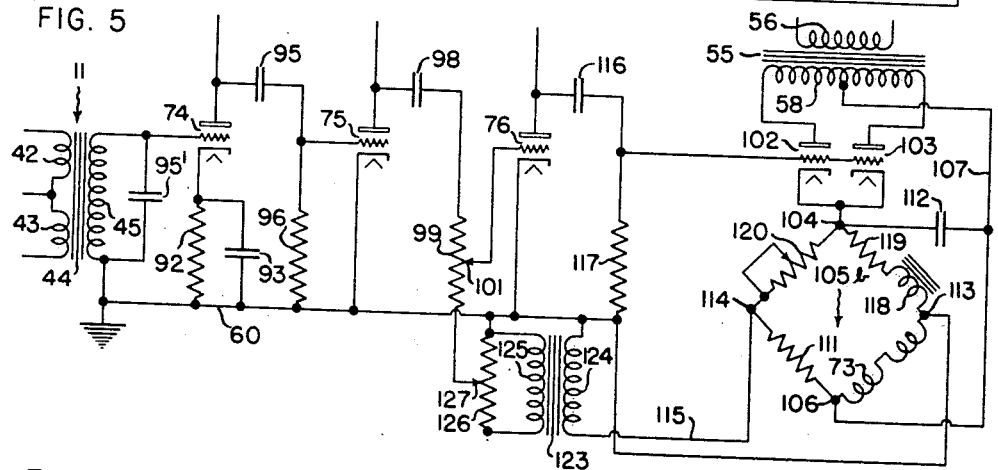

In Fig. 5, we have illustrated a modification of the arrangement of Fig. 4 wherein the damping signal derived from the bridge network 105b is introduced into a later amplifying stage of the electronic device 9. To this end, the output voltage of the bridge network 105b is impressed on the input circuit of the triode 76, instead of on the input circuit of the triode 75 as in the arrangements of Figs. 1 and 2, through a transformer 123. The transformer 123 is provided with a primary winding 124 which is connected to the terminals 113 and 114 of the bridge network 105b and is provided with a secondary winding 125 which is connected to the terminals of a resistance 126. One terminal of the resistance 126 is connected to the grounded conductor 60 and a contact 127 which is in slidable engagement with the resistance 126 is connected to the lower terminal of the resistance 99.

In this modification, a variable part of the potential drop produced across the resistance 126, depending upon the adjustment of the contact 127, is impressed on the input circuit of the triode 76 in opposition to the signal impressed on the input circuit of the triode 76 from the output circuit of the triode 75. The transformer 123 preferably is a step-up transformer. This factor makes it possible to feed back the opposing electromotive force from the bridge network 105b to the later stage 76 of the electronic device 9 while still obtaining the same degree of damping.

Figure 6:
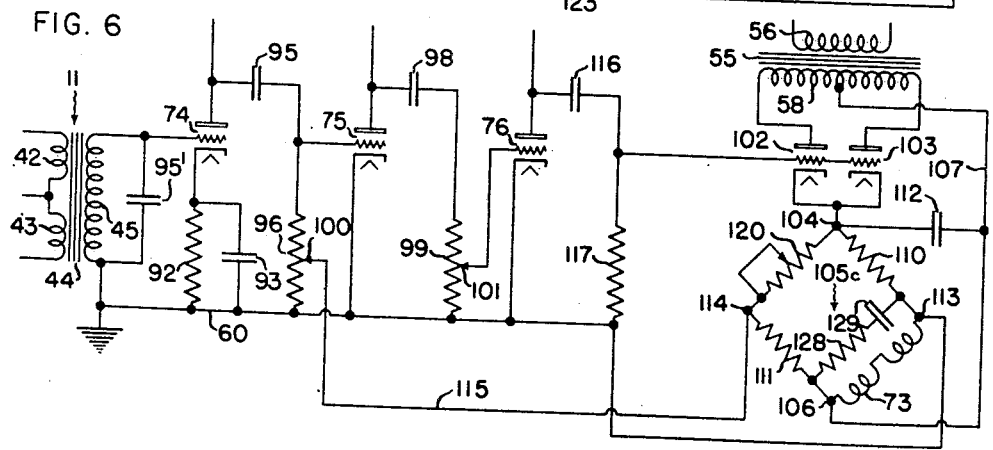

In Fig. 6, we have illustrated another modification of our invention in which a bridge network 105c having fixed resistances 110 and 111 in two arms and a variable resistance 120 in a third arm is utilized in lieu of the bridge network 105. The fourth arm of the bridge network 105c is comprised of two branches in one of which the motor winding 73 is connected and in the other of which a resistance 128 and a condenser 129 are connected in series. The resistance 128 preferably has a value approximately equal to the resistance of the winding 73 and the condenser 129 is so chosen that the resistance of the winding 73 or of resistance 128 is equal to the square root of the quantity comprising the inductance of motor winding 73 divided by the capacitance of the condenser 129. Thus, if the resistance of the winding 73 is $R_1$, the resistance of the resistance 128 is $R_2$, the inductance of the winding 73 is L, and the capacitance of the condenser 129 is C, the relationship may be stated as follows:

$$R_1 = R_2 = \sqrt{\frac{L}{C}}$$

With the components 73, 128 and 129 so chosen, it may be proved mathematically that the total impedance of the bridge arm including these elements is resistive in character and has the value of either the resistance 128 or of the winding 73. The bridge network 105c, therefore, essentially includes resistive elements in each of its arms, and therefore, the electromotive force produced between the output terminals 113 and 114 will be exactly in phase with or 180° out of phase with the voltage of the supply mains 37 and 38. Accordingly, the voltage fed back in opposition to the controlling signal in the electronic device 9 will be exactly 180° out of phase therewith. It is noted further that the character of the bridge network 105c of being essentially a resistive bridge is not altered by change in frequency of the energizing current impressed on the input terminals 104 and 106. Hence, the bridge network 105c remains balanced regardless of the frequency of the voltage impressed on its input terminals.

The conversion type potentiometer and the electronic amplifying and motor drive rebalancing means therefor disclosed in this application and not claimed herein is disclosed and is being claimed in the aforementioned Wills Patent No. 2,423,540.

While in accordance with the provisions of the statutes, we have illustrated and described the best forms of embodiment of our invention now known to us, it will be apparent to those skilled in the art that changes may be made in the forms of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent is:

1. A system comprising an electrical network, means to produce an unbalanced alternating electromotive force of one phase or of opposite phase in said network, a device adjustable to reduce said unbalanced electromotive force, an alternating current supply circuit, a pair of grid controlled electronic devices having output circuits connected in opposite phase relation to said alternating current circuit and having a common output circuit to which said electronic devices are connected in parallel relation, means to supply grid potentials to said electronic devices to selectively render one of said devices more conductive than the other in accordance with the phase of said unbalanced electromotive force, a resistance connected in said output circuit to supply biasing grid potentials to said electronic devices, an alternating current motor to adjust said first mentioned device having a winding connected to said alternating current supply circuit and a winding connected to the output circuit of said electronic devices, a bridge network including said resistance in one arm and said second mentioned winding in another arm to derive an alternating electromotive force proportional to the motor speed, and means to oppose said derived electromotive force to said unbalanced electromotive force.

2. A system comprising an electrical network, means to produce an unbalanced alternating electromotive force of one phase or of opposite phase in said network, a device adjustable to reduce said unbalanced electromotive force, an alternating current supply circuit, a pair of grid controlled electronic devices having output circuits connected in opposite phase relation to said alternating current circuit and having a common output circuit to which said electronic devices are connected in parallel relation, means to supply grid potentials to said electronic devices to selectively render one of said devices more conductive than the other in accordance with the phase of said unbalanced electromotive force, a resistance connected in said output circuit to supply biasing grid potentials to said electronic devices, an alternating current motor to adjust said first mentioned device having a winding connected to said alternating current supply circuit and a winding connected to the output circuit of said electronic devices, a normally balanced bridge network including said resistance in one arm and said second mentioned winding in another arm and adapted to be unbalanced upon motor rotation to derive an alternating electromotive force proportional to the motor speed, said bridge network including a reactance in one of the arms thereof to compensate for the reactance of said second mentioned motor winding for balancing said bridge when said motor is not rotating, and means to oppose said derived electromotive force to said unbalanced electromotive force.

3. A system comprising an electrical network, means to produce an unbalanced alternating electromotive force of one phase or of opposite phase in said network, a device adjustable to reduce said unbalanced electromotive force, an alternating current supply circuit, a pair of grid controlled electronic devices having output circuits connected in opposite phase relation to said alternating current circuit and having a common output circuit to which said electronic devices are connected in parallel relation, means to supply grid potentials to said electronic devices to selectively render one of said devices more conductive than the other in accordance with the phase of said unbalanced electromotive force, an alternating current motor to adjust said first mentioned device having a winding connected to said alternating current supply circuit and a winding connected to the output circuit of said electronic devices, a normally balanced bridge network including said second mentioned winding in one arm and adapted to be unbalanced upon motor rotation to derive an alternating electromotive force proportional to the motor speed, said bridge network including a condenser in one of the arms thereof to compensate for the reactance of said second mentioned motor winding for balancing said bridge when said motor is not rotating, and means to oppose said derived electromotive force to said unbalanced electromotive force.

4. The combination of claim 3 wherein said condenser is included in an arm of said bridge network different from that in which said second mentioned winding is included.

5. A system comprising an electrical network, means to produce an unbalanced alternating electromotive force of one phase or of opposite phase in said network, a device adjustable to reduce said unbalanced electromotive force, an alternating current supply circuit, a pair of grid controlled electronic devices having output circuits connected in opposite phase relation to said alternating current circuit and having a common output circuit to which said electronic devices are connected in parallel relation, means to supply grid potentials to said electronic devices to selectively render one of said devices more conductive than the other in accordance with the phase of said unbalanced electromotive force, an alternating current motor to adjust said first mentioned device having a winding connected to said alternating current supply circuit and a winding connected to the output circuit of said electronic devices, a normally balanced bridge network including resistances only in three arms and said second mentioned winding in the fourth arm and adapted to be unbalanced upon motor rotation to derive an alternating electromotive force proportional to the motor speed, said bridge network including a condenser and a resistance in shunt to said second mentioned winding to compensate for the reactance of said second mentioned motor winding for balancing said bridge when said motor is not rotating, and means to oppose said derived electromotive force to said unbalanced electromotive force.

6. A system comprising an electrical network, means to produce an unbalanced alternating electromotive force of one phase or of opposite phase in said network, a device adjustable to reduce said unbalanced electromotive force, an alternating current supply circuit, a pair of grid controlled electronic devices having output circuits connected in opposite phase relation to said alternating current circuit and having a common output circuit to which said electronic devices are connected in parallel relation, means to supply grid potentials to said grid controlled electronic devices to selectively render one of said devices more conductive than the other in accordance with the phase of said unbalanced electromotive force, an alternating current motor to adjust said first mentioned device having a winding connected to said alternating current supply circuit and a winding connected to the output circuit of said electronic devices, a normally balanced bridge network including resistances in diametrically opposed arms, said second mentioned motor winding in a third arm and a resistance and a condenser in series in the fourth arm to derive an alternating electromotive force proportional to the motor speed, and means to oppose said derived electromotive force to said unbalanced electromotive force.

7. A system comprising an electrical network, means to produce an unbalanced alternating electromotive force of one phase or of opposite phase in said network, a device adjustable to reduce said unbalanced electromotive force, an alternating current supply circuit, a pair of grid controlled electronic devices having output circuits connected in opposite phase relation to said alternating current circuit and having a common output circuit to which said electronic devices are connected in parallel relation, means to supply grid potentials to said grid controlled electronic devices to selectively render one of said devices more conductive than the other in accordance with the phase of said unbalanced electromotive force, an alternating current motor to adjust said first mentioned device having a winding connected to said alternating current supply circuit and a winding connected to the output circuit of said electronic devices, a normally balanced bridge network including resistances in diametrically opposed arms, said second mentioned motor winding in a third arm and a resistance and a condenser in parallel in the fourth arm to derive an alternating electromotive force proportional to the motor speed, and means to oppose said derived electromotive force to said unbalanced electromotive force.

8. A system comprising an electrical network, means to produce an unbalanced alternating electromotive force of one phase or of opposite phase in said network, a device adjustable to reduce said unbalanced electromotive force, an alternating current supply circuit, an electronic amplifier having a plurality of stages and having an input circuit to which said electromotive force is applied, a pair of grid controlled electronic devices having output circuits connected in opposite phase relation to said alternating current circuit and having a common output circuit to which said electronic devices are connected in parallel relation, an output circuit for said electronic amplifier to supply grid potentials to said electronic devices to selectively render one of said devices more conductive than the other in accordance with the phase of said unbalanced electromotive force, an alternating current motor to adjust said first mentioned device having a winding connected to said alternating current supply circuit and a winding connected to the output circuit of said electronic devices, a normally balanced bridge network including resistances in diametrically opposed arms, said second mentioned motor winding in a third arm and a resistance and a condenser in the fourth arm to derive an alternating electromotive force proportional to the motor speed, and means to oppose said derived electromotive force to the amplified quantity of said unbalanced electromotive force at an intermediate stage of said electronic amplifier.

9. A system comprising an electrical network, means to produce an alternating signal of one phase or of opposite phase in said network, a device adjustable to reduce said alternating signal, an alternating current supply circuit, an electronic amplifier having a plurality of stages and having an input circuit to which said electromotive force is applied, a pair of grid controlled electronic devices having output circuits connected in opposite phase relation to said alternating current circuit and having a common output circuit to which said electronic devices are connected in parallel relation, an output circuit for said electronic amplifier to supply grid potentials to said electronic devices to selectively render one of said devices more conductive than the other in accordance with the phase of said alternating signal, an alternating current motor to adjust said first mentioned device having a winding connected to said alternating current supply circuit and a winding connected to the output circuit of said electronic devices, a normally balanced bridge network including resistances in diametrically opposed arms, said second mentioned motor winding in a third arm and a resistance and a condenser in series in the fourth arm to derive an alternating signal of magnitude proportional to the motor speed and of the same frequency as said first mentioned alternating signal, and means to oppose said derived alternating signal to the amplified quantity of said first mentioned alternating signal at an intermediate stage of said electronic amplifier.

10. A system comprising an electrical network, means to produce an unbalanced alternating electromotive force of one phase or of opposite phase in said network, a device adjustable to reduce said unbalanced electromotive force, an alternating current supply circuit, a pair of grid controlled electronic devices having output circuits connected in opposite phase relation to said alternating current circuit and having a common output circuit to which said electronic devices are connected in parallel relation, means to supply grid potentials to said electronic devices to selectively render one of said devices more conductive than the other in accordance with the phase of said unbalanced electromotive force, an alternating current motor to adjust said first mentioned device having a winding connected to said alternating current supply circuit and a winding connected to the output circuit of said electronic devices, a normally balanced bridge network including resistances in three arms and said second mentioned motor winding in the fourth arm shunted by a resistance and a condenser connected in series to derive an alternating electromotive force proportional to the motor speed, and means to oppose said derived electromotive force to said unbalanced electromotive force.

11. A system comprising an electrical network, means to produce an unbalanced alternating electromotive force of one phase or of opposite phase in said network, an alternating current supply circuit, a pair of grid controlled electronic devices having output circuits connected in opposite phase relation to said alternating current circuit and having a common output circuit to which said electronic devices are connected in parallel relation, means to supply grid potentials to said electronic devices to selectively render one of said devices more conductive than the other in accordance with the phase of said unbalanced electromotive force, a reversible alternating current motor having a winding connected to said alternating current supply circuit and a winding connected to the output circuit of said electronic devices, a normally balanced bridge network including resistances only in three arms and said second mentioned winding in the fourth arm and adapted to be unbalanced upon motor rotation to derive an alternating electromotive force proportional to the motor speed, said bridge network including a condenser and a resistance in shunt to said second mentioned winding to compensate for the reactance of said second mentioned motor winding for balancing said bridge when said motor is not rotating, and means to oppose said derived electromotive force to said unbalanced electromotive force.

12. A system comprising an electrical network, means to produce an unbalanced alternating electromotive force of one phase or of opposite phase in said network, an alternating current supply circuit, a pair of grid controlled electronic devices having output circuits connected in opposite phase relation to said alternating current circuit and having a common output circuit to which said electronic devices are connected in parallel relation, means to supply grid potentials to said grid controlled devices to selectively render one of said devices more conductive than the other in accordance with the phase of said unbalanced electromotive force, a reversible alternating current motor having a winding connected to said alternating current supply circuit and a winding connected to the output circuit of said electronic devices, a normally balanced bridge network including resistances in diametrically opposed arms, said second mentioned motor winding in a third arm and a resistance and a condenser in series in the fourth arm to derive an alternating electromotive force proportional to the motor speed, and means to oppose said derived electromotive force to said unbalanced electromotive force.

13. A system comprising an electrical network, means to produce an unbalanced alternating electromotive force of one phase or of opposite phase in said network, an alternating current supply circuit, a pair of grid controlled electronic devices having output circuits connected in opposite phase relation to said alternating current circuit and having a common output circuit to which said electronic devices are connected in parallel relation, means to supply grid potentials to said grid controlled electronic devices to selectively render one of said devices more conductive than the other in accordance with the phase of said unbalanced electromotive force, a reversible alternating current motor having a winding connected to said alternating current supply circuit and a winding connected to the output circuit of said electronic devices, a normally balanced bridge network including resistances in diametrically opposed arms, said second mentioned motor winding in a third arm and a resistance and a condenser in parallel in the fourth arm to derive an alternating electromotive force proportional to the motor speed and means to oppose said derived electromotive force to said unbalanced electromotive force.

14. A system comprising an electrical network, means to produce an unbalanced alternating electromotive force of one phase or of opposite phase in said network, an alternating current supply circuit, an electronic amplifier having a plurality of stages and having an input circuit to which said electromotive force is applied, a pair of grid controlled electronic devices having output circuits connected in opposite phase relation to said alternating current circuit and having a common output circuit to which said electronic devices are connected in parallel relation, an output circuit for said electronic amplifier to supply grid potentials to said electronic devices to selectively render one of said devices more conductive than the other in accordance with the phase of said unbalanced electromotive force, a reversible alternating current motor having a winding connected to said alternating current supply circuit and a winding connected to the output circuit of said electronic devices, a normally balanced bridge network including resistances in diametrically opposed arms, said second mentioned motor winding in a third arm and a resistance and a condenser in the fourth arm to derive an alternating electromotive force proportional to the motor speed, and means to oppose said derived electromotive force to the amplified quantity of said unbalanced electromotive force at an intermediate stage of said electronic amplifier.

15. A system comprising an electrical network, means to produce an alternating signal of one phase or of opposite phase in said network, an alternating current supply circuit, an electronic amplifier having a plurality of stages and having an input circuit to which said electromotive force is applied, a pair of grid controlled electronic devices having output circuits connected in opposite phase relation to said alternating current circuit and having a common output circuit to which said electronic devices are connected in parallel relation, an output circuit for said electronic amplifier to supply grid potentials to said electronic devices to selectively render one of said devices more conductive than the other in accordance with the phase of said alternating signal, a reversible alternating current motor having a winding connected to said alternating current supply circuit and a winding connected to the output circuit of said electronic devices, a normally balanced bridge network including resistances in diametrically opposed arms, said second mentioned motor winding in a third arm and a resistance and a condenser in series in the fourth arm to derive an alternating signal of magnitude proportional to the motor speed and of the same frequency as said first mentioned alternating signal, and means to oppose said derived alternating signal to the amplified quantity of said first mentioned alternating signal at an intermediate stage of said electronic amplifier.

16. A system comprising an electrical network, means to produce an unbalanced alternating electromotive force of one phase or of opposite phase in said network, an alternating current supply circuit, a pair of grid controlled electronic devices having output circuits connected in opposite phase relation to said alternating current circuit and having a common output circuit to which said electronic devices are connected in parallel relation, means to supply grid potentials to said electronic devices to selectively render one of said devices more conductive than the other in accordance with the phase of said unbalanced electromotive force, a reversible alternating current motor having a winding connected to said alternating current supply circuit and a winding connected to the output circuit of said electronic devices, a normally balanced bridge network including resistances in three arms and said second mentioned motor winding in the fourth arm shunted by a resistance and a condenser connected in series to derive an alternating electromotive force proportional to the motor speed, and means to oppose said derived electromotive force to said unbalanced electromotive force.

THOMAS R. HARRISON.
LLOYD B. CHERRY.

REFERENCES CITED

The following references are of record in the file of this patent:

UNITED STATES PATENTS

| Number | Name | Date |
|---|---|---|
| 1,998,939 | Mittage | Apr. 23, 1935 |
| 2,191,997 | Side | Feb. 27, 1940 |
| 2,263,497 | Harrison | Nov. 18, 1941 |
| 2,376,599 | Jones | May 22, 1945 |